United States Patent
Stephan et al.

(10) Patent No.: US 12,355,808 B2
(45) Date of Patent: Jul. 8, 2025

(54) METHOD FOR SECURING THE TRANSMISSION OF AT LEAST ONE DATA PACKET ALONG A DATA PATH OF A TELECOMMUNICATIONS NETWORK, CORRESPONDING COMPUTER PROGRAM PRODUCT AND DEVICE

(71) Applicant: Orange, Issy-les-Moulineaux (FR)

(72) Inventors: Emile Stephan, Chatillon (FR); Gaël Fromentoux, Chatillon (FR); Frédéric Fieau, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 394 days.

(21) Appl. No.: 17/593,620

(22) PCT Filed: Mar. 13, 2020

(86) PCT No.: PCT/FR2020/050530
§ 371 (c)(1),
(2) Date: Sep. 21, 2021

(87) PCT Pub. No.: WO2020/193902
PCT Pub. Date: Oct. 1, 2020

(65) Prior Publication Data
US 2022/0159037 A1    May 19, 2022

(30) Foreign Application Priority Data
Mar. 22, 2019   (FR) ..................................... 1902974

(51) Int. Cl.
*H04L 9/40*    (2022.01)
*H04L 45/42*   (2022.01)

(52) U.S. Cl.
CPC .......... *H04L 63/1466* (2013.01); *H04L 45/42* (2013.01); *H04L 63/1416* (2013.01); *H04L 63/1425* (2013.01); *H04L 63/20* (2013.01)

(58) Field of Classification Search
CPC ....... H04L 9/40; H04L 45/42; H04L 63/1466; H04L 63/1416; H04L 63/1425;
(Continued)

(56) References Cited

U.S. PATENT DOCUMENTS 7,835,280 B2 * 11/2010 Pang ........................ H04J 3/14
370/230.1
2003/0033404 A1    2/2003 Richardson
(Continued)

OTHER PUBLICATIONS

"Jitter in Networking"—Christine Shaw, Extra Hop, Jul. 18, 2018 https://www.extrahop.com/blog/jitter-and-jitter-buffers-definition-optimization (Year: 2018).*
(Continued)

*Primary Examiner* — Randy A Scott
(74) *Attorney, Agent, or Firm* — Knobbe, Martens, Olson & Bear, LLP

(57) ABSTRACT

A method for securing the transmission of at least one data packet along a data path of a telecommunications network is disclosed. According to such a method, a security device performs: obtaining a variance delay representative of a difference between an actual end-to-end transit delay of the at least one data packet along the data path and an expected end-to-end transit delay of the at least one data packet along the data path; and securing the transmission by implementing at least one security action based on the variance delay.

13 Claims, 3 Drawing Sheets

(58) Field of Classification Search
CPC ............... H04L 63/30; H04L 63/1441; H04W 12/122; H04W 12/61
See application file for complete search history.

(56) References Cited

U.S. PATENT DOCUMENTS

| | | |
|---|---|---|
| 2004/0107252 A1 | 6/2004 | Futa et al. |
| 2010/0172259 A1 | 7/2010 | Aggarwal et al. |
| 2013/0235878 A1* | 9/2013 | Hirota .................. H04J 3/0667 370/412 |
| 2015/0009840 A1* | 1/2015 | Pruthi .................... H04L 43/16 370/252 |
| 2017/0373950 A1* | 12/2017 | Szilagyi .............. H04L 47/2416 |
| 2020/0044937 A1* | 2/2020 | Joos ...................... H04J 3/0635 |

OTHER PUBLICATIONS

"The Difference Between Jitter and Latency"—Mellen et al., CallStats. io, Mar. 7, 2018 https://dialogue-io.github.io/2018/03/07/difference-between-jitter-and-latency/ (Year: 2018).*
International Search Report for International Application No. PCT/FR2020/050530 dated Jul. 17, 2020.

* cited by examiner

[Fig 1]
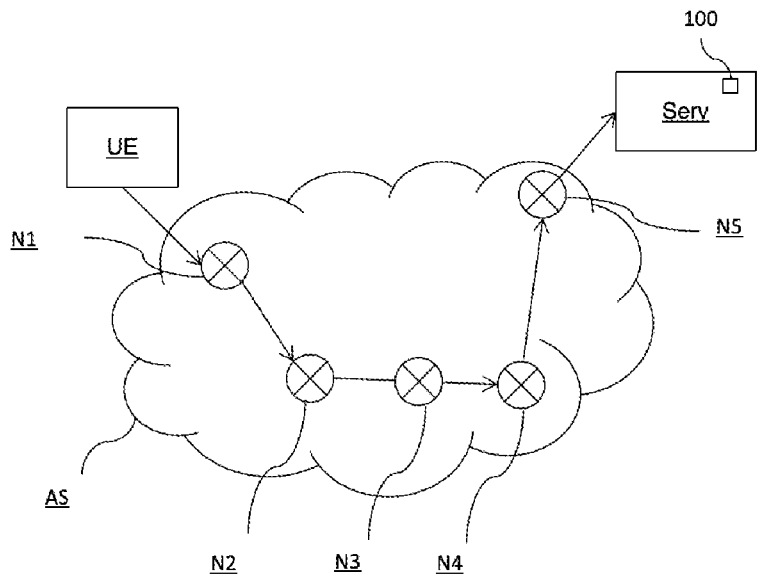
[Fig 2]
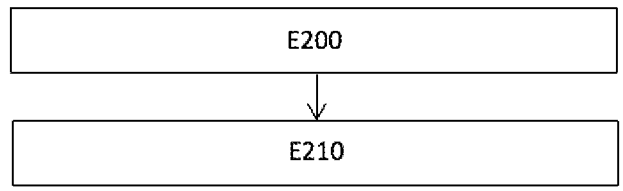
[Fig 3]
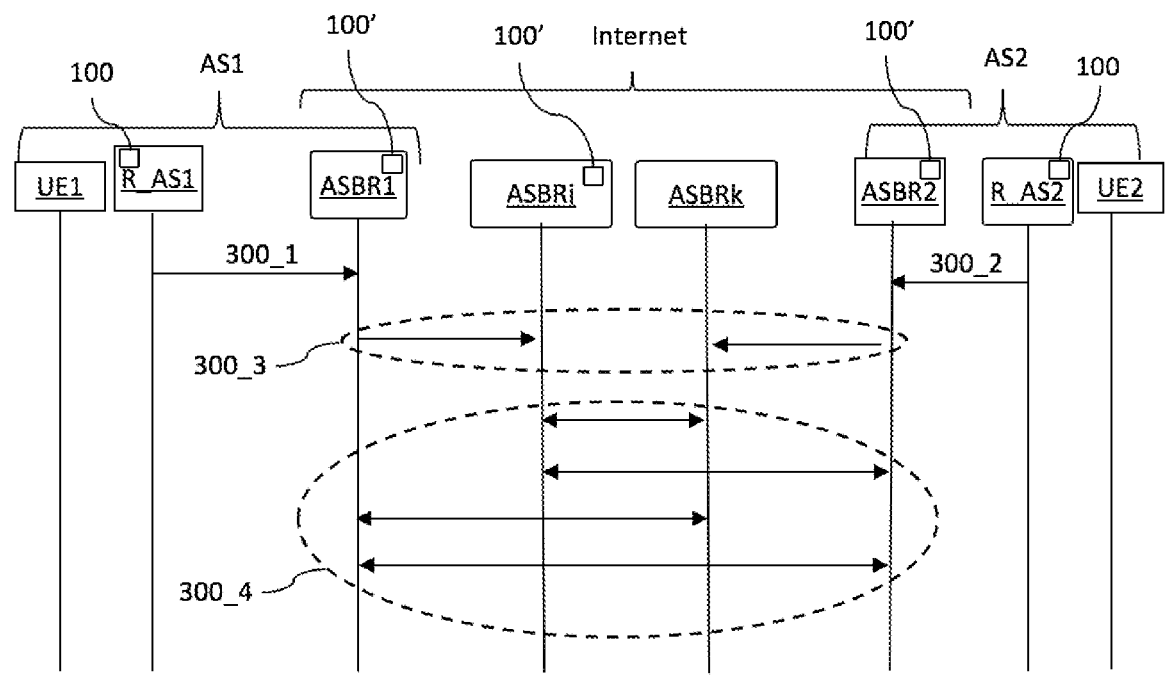

[Fig 4]
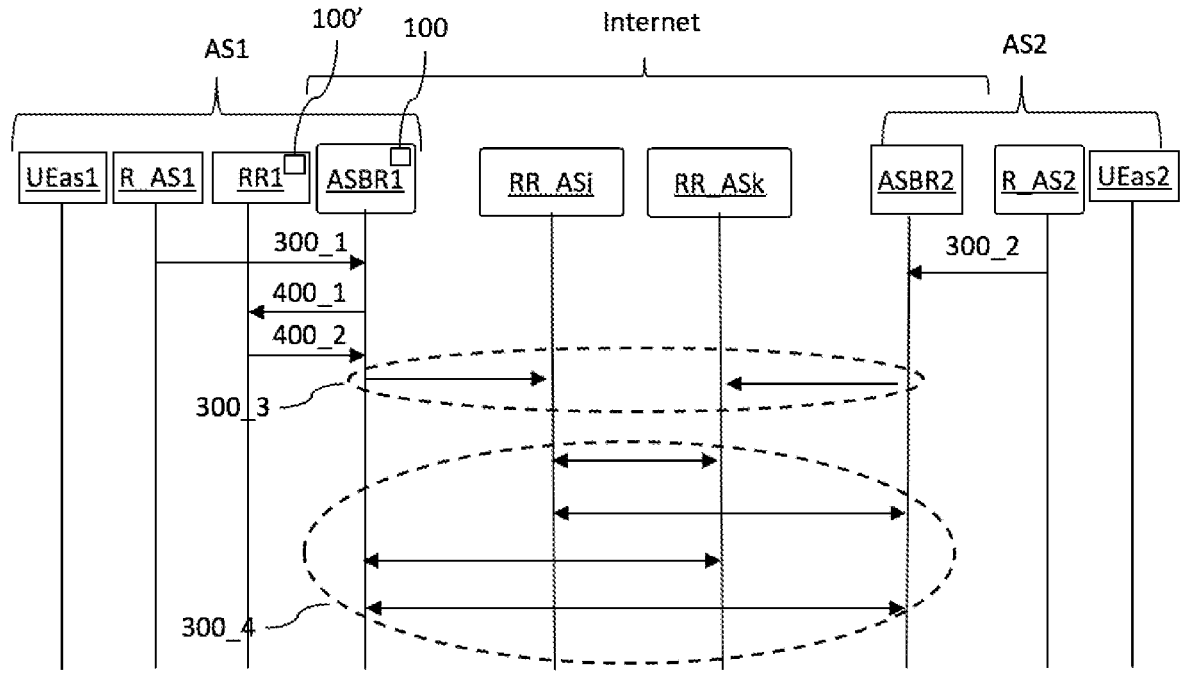
[Fig 5]
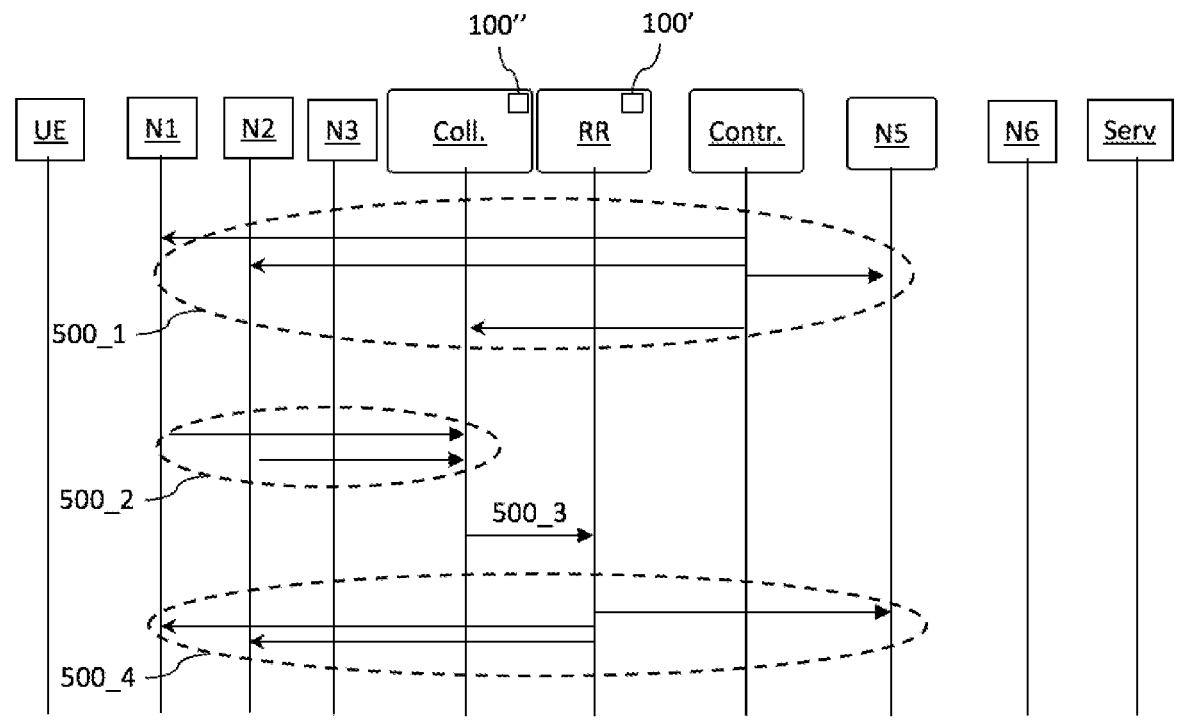

[Fig 6]
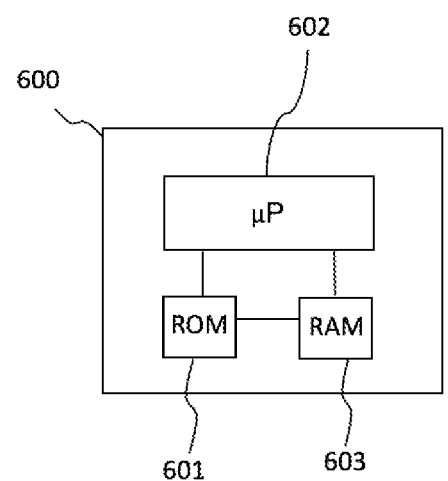

METHOD FOR SECURING THE TRANSMISSION OF AT LEAST ONE DATA PACKET ALONG A DATA PATH OF A TELECOMMUNICATIONS NETWORK, CORRESPONDING COMPUTER PROGRAM PRODUCT AND DEVICE

CROSS-REFERENCE TO RELATED APPLICATIONS

This application is filed under 35 U.S.C. § 371 as the U.S. National Phase of Application No. PCT/FR2020/050530 entitled "METHOD FOR SECURING THE TRANSMISSION OF AT LEAST ONE DATA PACKET ALONG DATA PATH OF A TELECOMMUNICATIONS NETWORK, CORRESPONDING COMPUTER PROGRAM PRODUCT AND DEVICE" and filed Mar. 13, 2020, and which claims priority to FR 1902974 filed Mar. 22, 2019, each of which is incorporated by reference in its entirety.

BACKGROUND

Field

The field of the development is that of the implementation of telecommunications networks. More particularly, the development relates to securing the transmission of data in such telecommunications networks.

The development has numerous applications, particularly, but not exclusively, in the field of latest generation or next generation telecommunications networks.

Description of the Related Technology

Methods exist making it possible to verify the passage of data packets through a succession of nodes of a data path of a telecommunications network. More particularly, these methods are adapted to verify the passage into so-called confidence nodes, that is to say known by the entity in charge of verifying the entities of the network. By way of example, the PoT (Proof of Transit) protocol developed by Cisco® and standardised within the IETF (Internet Engineering Task Force) can be cited.

However, such methods are most of the time said to be "administered" within the meaning where they assume a pre-configuration of the nodes of the path on which the verification is desired to be made. In the case of the PoT protocol, this pre-configuration is complex and cumbersome: The calculation algorithm is dependent on the topology of the path. For example, the power of the polynomial used for the verification depends on the number of nodes of the data path. In addition the protection of the algorithm requires the dynamic determination of polynomials associating the end routers of the data path. Likewise, such methods do not support variations on the data path and therefore only apply to networks of which the topology is highly controlled.

Moreover, such methods only make it possible to prove the passage of data packets through confidence nodes of a data path, but do not say anything about what happens between two of these confidence nodes.

Thus, there is a need for a technique making it possible to secure the transmission of data along a data path by making it possible to estimate whether a topological modification could occur along the data path between two confidence nodes, e.g. whether a third-party device that does not form part of the confidence devices has been added on the data path, or whether a portion of the hardware functions implanted along the path have been moved virtually.

There is also a need for the technique in question to be easy to implement.

SUMMARY OF CERTAIN INVENTIVE ASPECTS

In one embodiment of the development, a method for securing the transmission of at least one data packet along a data path of a telecommunications network is proposed. According to such a method, a security device performs the following steps: obtaining a variance delay representative of a difference between an actual end-to-end transit delay of said at least one data packet along the data path and an expected end-to-end transit delay of said at least one data packet along said data path; and securing the transmission by implementing at least one security action based on said variance delay.

Thus, the development proposes a novel and inventive solution for securing the transmission of data in a telecommunications network.

More particularly, obtaining a variance delay associated with a packet having followed a given data path makes it possible to determine whether the delay that it has effectively taken in order to follow the path in question (i.e. the actual end-to-end transit delay along the data path, the path extending between any two nodes of the network) is different from the delay such as expected, for example by taking into account known physical implementation constraints of the data path, to follow the path in question (i.e. the expected end-to-end transit delay along the data path). If such is the case, it may be deduced that the path in question has been modified, for example when a third-party device that does not form part of the confidence devices has been added on the data path, or if a portion of the hardware functions implanted along the path has been moved virtually.

According to one embodiment, obtaining said variance delay corresponds to a calculation of said variance delay comprising obtaining said actual end-to-end transit delay by: measuring in advance the end-to-end transit delay along the data path; or by measuring in advance a half value of the round trip transit delay along the data path.

For example, when the data packet(s) is(are) formatted according to the QUIC protocol, the total round trip transit times and on the downstream and upstream segments are obtained by observing the change of the value of the "spinbit" according to this protocol. In this way the actual end-to-end transit delays and relating to the point of observation are easily obtained.

According to one embodiment, the data path passes through at least one node of the network. For each of the nodes, the calculation of the variance delay comprises obtaining a transition delay of the node for said at least one data packet. The expected end-to-end transit delay is dependent on said at least one transition delay.

According to one embodiment, the data path passes through at least two nodes of the network. For each node pair of the at least two nodes, the calculation of the variance delay comprises obtaining a propagation delay of said at least one data packet along the data path between the nodes of the node pair. The expected end-to-end transit delay is dependent on said at least one propagation delay. The propagation delay is a physical parameter that is generally available in the equipment or during deployments of links.

Thus, the expected end-to-end transit delay is more accurate because also taking into account the delay on the interconnections between the nodes.

According to one embodiment, the variance delay is calculated as a function of the actual end-to-end transit delay to which is subtracted said at least one transition delay and/or said at least one propagation delay.

Thus, the calculation of the variance delay is simple and robust.

According to one embodiment, the data path extends between a first and a second network node of the network, the security device being housed in the second network node. Said at least one transition delay is obtained based on at least one parameter conveyed within said at least one data packet.

For example, in the case of a plurality of data packets of a connection of the QUIC protocol, the transition delay is aggregated locally then conveyed by the last packet of RESET or GOAWAY type of the flow in question. Thus, the transition delays are easily conveyed along the data path up to the device calculating the variance delay.

According to one embodiment, when the security device is housed in the second network node, said a least one security action belongs to the group comprising: entering the variance delay into said at least one data packet. Thus the variance delay remains associated with a data packet(s) regardless of its destination, thereby making a subsequent verification possible that it (or they) were able to be altered along the data path; entering the variance delay in association with the data path into a routing plan of an autonomous system of the network to which the data path belongs. Thus an overall securing of the network is obtained via a mapping of the variance delays of the data paths of the network; destroying or duplicating for analysis said at least one data packet when the variance delay is greater than a predetermined threshold; transmitting the variance delay to at least one other device included in a node that is not located along the data path in order to implement another security action. Thus a specific security action may be implemented by a dedicated device; and combining all or part of the alternatives of the aforementioned group.

Thus, a network with very low variance may be formed based on selecting only the routes of which the variance is lower than a predetermined value.

According to one embodiment, the security device is not located along the data path. The transition delay is received based on said at least one node via at least one other data packet different from said at least one data packet.

According to one embodiment, when the security device is not located along the data path, the transition delay is received in an encrypted form, the security device and said at least one node sharing the knowledge of at least one item of encryption information.

Thus, the transfer of the transition delay from the node(s) to the security device is secured. For example, the encryption information may use certain shared parameters of the PoT protocol.

According to one embodiment, said at least one item of encryption information is obtained by said at least one node via said at least one data packet.

According to one embodiment, when the security device is not located along the data path, said a least one security action belongs to the group comprising: entering the variance delay in association with the data path into a routing plan of an autonomous system of the network to which the data path belongs. Thus an overall securing of the network is obtained via a mapping of the variance delays of the data paths of the network; transmitting the variance delay to at least one other device included in a node that is not located along the data path in order to implement another security action. Thus a specific security action may be implemented by a dedicated device; and combining all or part of the aforementioned alternatives of the group.

According to one embodiment, obtaining the variance delay corresponds to a receipt, via another data packet different from said at least one data packet, of the variance delay from another device located along the data path. Said at least one security action belongs to the group comprising: entering the variance delay in association with the data path into a routing plan of an autonomous system of the network to which the data path belongs. Thus an overall securing of the network is obtained via a mapping of the variance delays of the data paths of the network; transmitting the variance delay to at least one other device included in a node that is not located along the data path in order to implement another security action. Thus a specific security action may be implemented by a dedicated device; and combining all or part of the aforementioned alternatives of the group.

According to one embodiment, the security method is implemented successively for a plurality of data paths of the network.

The development also relates to a computer program comprising program code instructions for implementing the method such as previously described, according to any one of its various embodiments, when it is executed on a computer.

In one embodiment of the development, a device for securing the transmission of at least one data packet along a data path of a telecommunications network is proposed. Such a security device comprises a reprogrammable calculation machine or a dedicated calculation machine configured to implement the steps of the security method according to the development (according to any one of the various aforementioned embodiments).

Thus, the features and advantages of this device are the same as those of the corresponding steps of the security method previously described. Consequently, they are not described in more detail.

In one embodiment of the development, a node of a telecommunications network is proposed. Such a network node comprises at least one aforementioned security device (according to any one of the various aforementioned embodiments).

BRIEF DESCRIPTION OF THE DRAWINGS

Other aims, features and advantages of the development will become more apparent upon reading the following description, given by way of simple illustrative, and non-limiting example, in relation with the figures, wherein:

FIG. 1 shows a data path of an autonomous system of a telecommunications network along which the transmission of data is secured by implementing a security method according to one embodiment of the development;

FIG. 2 shows the steps of a method for securing the transmission of data along a data path according to one embodiment of the development;

FIG. 3 shows an example of exchanges between entities of a telecommunications network implementing the method for securing the transmission of data according to one embodiment of the development;

FIG. 4 shows an example of exchanges between entities of a telecommunications network implementing the method for securing the transmission of data according to another embodiment of the development;

FIG. 5 shows an example of exchanges between entities of a telecommunications network implementing the method for securing the transmission of data according to yet another embodiment of the development;

FIG. 6 shows an example of device structure making it possible to implement steps of the method of FIG. 2 according to one embodiment of the development.

DETAILED DESCRIPTION OF CERTAIN ILLUSTRATIVE EMBODIMENTS

The general principle of the development is based on obtaining a variance delay of one (or more) data packet(s) along a data path (e.g. that extends between two of the nodes of the network). More particularly, the variance delay is representative of a difference between: an actual end-to-end transit delay of the data packet along the data path (i.e. the delay that the packet has effectively taken in order to follow the data path); and an expected end-to-end transit delay of the data packet along the data path (i.e. all or part of the known delay, e.g. associated with the confidence nodes, that the packet is assumed to take in order to follow the data path).

Such a metric is relevant in order to secure the transmission of data in the network and a security action may be implemented based on such a variance delay. For example, a value of the variance delay greater than a predetermined threshold is representative of the fact that the data path taken by the data packet was able to be modified, for example when a third-party device that does not form part of the confidence devices has been added on the data path, or if a portion of the hardware functions implanted along the path have been moved virtually.

In relation to FIG. 1 a data path of an autonomous system (AS) of a telecommunications network along which the transmission of data is secured by a security method according to one embodiment of the development is now presented.

More particularly, user equipment UE sends a data packet to a server Serv via the data path passing through the five network nodes, N1 to N5, which are here confidence nodes. For example, the confidence in the nodes N1 to N5 is established by implementing the PoT mechanism.

A security device 100 implements the security method described above below in relation to the steps shown in FIG. 2 in order to secure the data path between the equipment UE and the server Serv.

More particularly, during step E200, a variance delay representative of a difference between an actual end-to-end transit delay of one (or more) data packet(s) along the data path and an expected end-to-end transit delay of the packet(s) along the data path is obtained.

In the embodiment of FIG. 1, obtaining the variance delay corresponds to a calculation of the variance delay by the device 100.

For this, the device 100 obtains a transition delay of all or part of the confidence nodes for the data packet(s), the expected end-to-end transit delay wherein the device 100 is located being dependent on the transition delay(s) in question.

For example, the transition delay is provided by the corresponding confidence node (i.e. N1 or N2 or N3 or N4 or N5) to the device 100 in order to determine the variance delay. For this, in the embodiment of FIG. 1, each confidence node adds its own transition delay to the value of transition delays of the nodes previously traversed by the packet or flow along the data path. The value of the total transition delay thus obtained is conveyed in a predefined field of the packet or of the flow in question (e.g. in the last RESET or GOAWAY packet of a QUIC connection, or periodically in any packet of the flow, or also in a packet added to the flow as an ICMP packet, etc.). It is a so-called "in-band" embodiment (i.e. the transition delay is included in the data packet(s) in the form of a particular field).

In other so-called "out-of-band" embodiments, the value of the transition delay is exported to the security device via one (or more) packet(s) which is/are not a data packet(s) transiting via the data path. For example, the value of the transition delay is exported via a PSAMP (Packet SAMPling) protocol in the case of a single packet, or IPFIX (Internet Protocol Flow Information Export, e.g. netflow v9 for Cisco® and Juniper) for the case of a packet flow.

Returning to FIG. 1, Table 1 below gives examples of transition delays (taking into account for example the processing delays in the entities in question, switching, etc.) involved in the various entities shown in FIG. 1 when they are known.

TABLE 1

| | Transition delay of an entity (ms) |
|---|---|
| N1 | 15 |
| N2 | Unknown |
| N3 | 10 |
| N4 | Unknown |
| N5 | Unknown |

Moreover, in order to calculate the variance delay, the device 100 obtains the actual end-to-end delay (i.e. between the terminal and the server). For example, the actual end-to-end delay is obtained by the device 100 via the half-value of the round trip delay of data path. The value of the round trip delay in question is obtained for example via the "spinbit" when the data packet is according to the QUIC protocol. In other embodiments, the actual end-to-end delay is obtained by measuring in advance the transit delay along the data path.

By assuming that the actual end-to-end transit delay in the present case is equal to 200 ms, the device 100 calculates the variance delay by subtracting the known transition delays, here 15 and 10 ms with the actual end-to-end transit delay. 200−15−10=175 ms is then obtained.

Moreover, by assuming that the propagation delay between confidence nodes along the path is known, the variance delay may be refined in certain embodiments taking into account the propagation delay in question in the calculation of the expected end-to-end transit delay. Such a propagation delay is obtained for example by measuring in advance.

For example, by assuming that the propagation delay is equal to 30 ms in the topology of FIG. 1, the variance delay may be refined by subtracting the 30 ms in question from the value previously calculated, i.e. 175 ms. Finally, a variance delay calculated as being equal to 175−30=145 ms is obtained.

In other embodiments not shown in FIG. 1, the security device 100 is implemented not in the server Serv, but in one of the confidence nodes N1 to N5. In this case, the device 100 calculates the variance delay in relation to its position along the data path.

Moreover, in other embodiments described below in relation to FIG. 3, FIG. 4 and FIG. 5, the security device does not calculate the variance delay, but receives it from a third-party device that performed the calculation. In this case, step E200 of obtaining the variance delay amounts to a step of receiving the variance delay.

During step E210, the transmission of data is secured by implementing one (or more) security action(s) based on the variance delay obtained in step E200.

For example, in the embodiment of FIG. 1 wherein the security device 100 calculates the variance delay based on information (e.g. the transition delays) included in the data packet(s) (aforementioned "in-band" case), the security action belongs to the group comprising: entering the variance delay into the data packet(s); entering the variance delay in association with the data path into a routing plan of an autonomous system of the network to which the data path belongs (e.g. by using an EGP (Exterior Gateway Protocol) protocol of the BGP (Border Gateway Protocol) type); destroying or duplicating for analysis (e.g. via the transmission of the duplicated packet to analysis equipment) of the data packet(s) when the variance delay is greater than a predetermined threshold; transmitting the variance delay to at least one other device included in a node that is not located along the data path in order to implement another security action (e.g. to a collector implementing an IPFIX (Internet Protocol Flow Information Export) protocol); and combining all or part of the aforementioned alternatives of the group.

In relation to FIG. 3, an implementation of the security method according to one embodiment of the development is now presented.

In the embodiment of FIG. 3, the first and second autonomous systems AS1 and AS2 of the network each comprise a data path connecting user equipment UE1 or UE2 to a border router ASBR1 or ASBR2 (Autonomous System Border Router) via a confidence network node of the router type R_AS1 or R_AS2. Other autonomous systems, indexed j and k are also present of which only the border routers ASBRj and ASBRk are shown in order to interface with the other autonomous systems of the network.

All or part of the border routers ASBR1, ASBR2, ASBRj, ASBRk comprises a security device 100' according to an embodiment different from the embodiment described above in relation to FIG. 1. More particularly, the security device 100' does not calculate the variance delay, but receives it from a third-party device that previously performed the calculation. For example the device 100' included in the border router ASBR1 receives (arrow 300_1) the variance delay sent by the network node R_AS1 which, itself, implements the method according to the embodiment described above in relation to FIG. 1 (e.g. the network node R_AS1 comprises a security device 100 as described above). The same applies for the device 100' included in the border router ASBR2 which receives (arrow 300_2) the variance delay sent by the network node R_AS2 which, itself, implements the method according to the embodiment described above in relation to FIG. 1.

Generally, the border routers ASBR1, ASBR2, ASBRj, ASBRk may receive the variance delays of various data paths, for example when the security method is implemented successively for a plurality of data paths of the network. Such a reception is carried out for example via information according to an IGP (Interior gateway protocol) protocol. The border routers ASBR1, ASBR2, ASBRj, ASBRk aggregate the variance delays of the data paths for which they receive such variance delays and insert them as metrics into an EGP protocol (e.g. according to the BGP protocol) to other autonomous systems (arrows 300_3). Such transmissions may for example be carried out at the same time as transmissions of "conventional" EGP information (arrows 300_4).

In this way, according to the embodiment of FIG. 3 wherein the security device 100' receives the variance delay, the security action belongs to the group comprising:
entering the variance delay in association with the data path into a routing plan of an autonomous system of the network to which the data path belongs;
transmitting the variance delay to at least one other device included in a node that is not located along the data path in order to implement another security action (e.g. one inscription per third-party device of the variance delay in association with the data path in a routing plan); and
combining all or part of the aforementioned alternatives of the group.

In other embodiments not illustrated, the border routers ASBR1, ASBR2, ASBRj, ASBRk comprise the security device 100 according to the embodiment of FIG. 1. In this way, the calculation of the variance delay of the data path on which a given border router is found is performed in the border router in question.

In relation to FIG. 4, an implementation of the security method according to another embodiment of the development is now presented.

More particularly, the embodiment shown in FIG. 4 uses the elements of the embodiment of FIG. 3. Only a route reflector RR1, RR_ASj, RR_ASk is used in the corresponding autonomous systems.

In this way, the security device 100' is for example here included in the route reflector RR1 so as to inject the variance delays of the data paths received from the border router ASBR1 (arrow 400_1) as metrics into the EGP (e.g. according to the BGP protocol). According to the embodiment considered discussed above in relation to FIG. 3, the border router ASBR1 itself calculated the variance delay associated with the data path on which it is found (e.g. the border router ASBR1 comprises a device 100 as illustrated in FIG. 4) or received the variance delay in question (calculated by a confidence mode of the path in question which, itself, comprises e.g. a device 100 in this case not illustrated in FIG. 4) as well as optionally the variance delays associated with other paths of the autonomous system considered.

Returning to FIG. 4, the updated EGP is sent to the border router ASBR1 (arrow 400_2) in order to transmit to the other autonomous systems (arrows 300_3). Such transmissions may for example be carried out at the same time as transmissions of "conventional" EGP information (arrows 300_4).

Thus, according to the embodiment of FIG. 4 the security action is of the same nature as in the embodiment described above in relation to FIG. 3.

In relation to FIG. 5, an implementation of the security method according to yet another embodiment of the development is now presented.

In the embodiment of FIG. 5, the security device 100" calculates the variance delay based on information (e.g. the transition delays) that is transmitted to it by a means other than via the data packet(s). In other terms, the data packet(s) transiting along the data path for which the variance delay is desired to be obtained does not convey the transition delays (aforementioned "out-of-band" embodiment). Indeed, the security device 100" here is located in a collector CoII of the IPFIX type. In other embodiments, the device 100" is located in a confidence node that is not located on the data path to be secured.

More particularly, the security device 100" receives the transition delay(s) based on a corresponding confidence node N1, N2, N3, N5, N6 via one (or more) other data packet(s) different from the data packet(s) transiting on the data path for which the security device 100" will calculate the variance delay.

For this, in addition the controller configures (arrows 500_1) the aggregation level of the flow and the address of the collector Coll in each node N1, N2, N3, N5, N6. In addition, the controller Contr configures the aggregation level of the flow and the features of the connections with the collector Coll (address, keys, etc.).

Subsequently the data packets transport "in-band" (i.e. in a data field that they themselves convey) the two parameters:

RND; and

PoT: partial sum of the shared secret that the nodes N1, N2, N3, N5, N6 calculate (the constant of the polynomial POLY1 according to PoT).

As reminded above, in the embodiment of FIG. 5, the security device 100" calculates the variance delay based on information (e.g. the transition delays) that is not transmitted to it via the data packet(s) transiting along the data path for which the variance delay (aforementioned "out-of-band" case) is desired to be calculated. In this way, the nodes N1, N2, N3, N5, N6 do not insert their transition delay into the data packets transiting along the data path in question. A node N1, N2, N3, N5 or N6 cannot therefore calculate the variance delay.

In order to protect the exchanges, the controller Contr activates the PoT protocol on the path N1 to N5 in N1, N2 and N5. More particularly, the controller Contr configures (arrows 500_1) the common secret POLY2 and the secret of each node N1, N2, N5 of the path (xi,yi) at each of the nodes in question, as well as the expected result at the last node of the path, here N5. N5 is therefore the only one to (after the controller Contr) know the expected PoT measurement (aka the constant of POLY1). Subsequently each node protects its transition delay value with the aid of at least one of the PoT parameters known or calculatable by the controller Contr, for example POLY1, POLY2, RND and the secret of each node (xi,yi). For example. This makes it possible to:

Detect the modification and authentication of the transit nodes in the nodes: (xi,yi) is used as HMAC (keyed-hash message authentication code) signature key, Read protect: RND and used as encryption key for example with the AES (Advanced Encryption Standard).

The PoT activation may be partial and limited to POLY1.

Optionally, for a packet flow of a connection according to the QUIC protocol going from the user equipment UE to the server Serv, each node N1, N2, N3, N5 or N6 synchronises the export of the IPFIX ticket on the rising fronts of the "spinbits" of the QUIC packets and adds the round trip actual transit half-time measurements obtained in the ticket. This makes two things possible:

each node N1, N2, N3, N5 or N6 exports (arrows 500_2) to the collector Coll a ticket describing the same sequence of data packets. This increases the precision of the comparison and of the aggregation of the transition delays; and the round trip half transit time obtained, particularly at node N5, makes it possible to calculate very precise variance delays.

An example of ticket format is:

{
  Quintupled identifier flow, . . .
  t0,
  t1,
  number of bytes,
  number of packets,
  total local transition delay,
  Spatial delay: {round trip actual half transit time, descending round trip actual half transit time}
}

The device 100" of the collector Coll receives the transition delays of the various nodes N1, N2, N3, N5, N6. It decrypts them using "decryption keys" received from the controller Contr during the configuration as described above (In other terms, the device 100" decrypts the transition delays of the various nodes N1, N2, N3, N5, N6 based on encryption information that has been obtained by the various nodes in question N1, N2, N3, N5, N6 via the data packet(s) transiting along the data path considered. Such encryption information is used by the various nodes in question to encrypt their respective transition delay). The device 100" groups the transition delays received from the various nodes N1, N2, N3, N5, N6 by data packet flows following the aggregation flows also received from the controller Contr during the configuration. The device 100" calculates a variance delay for the data path corresponding to the requested aggregation.

The device 100" groups the results in a variance delay matrix. The inputs of the matrix correspond to the aggregation level of the flow selected (host, network, autonomous system). The device 100" makes it possible to access the matrix with the aid for example of the ALTO (Application-Layer Traffic Optimization) protocol. The security device 100" measures the variance delay variation. It signals an excessive increase as a possible attack of a node of the path on the packet flow.

Alternatively, or in combination, the security device 100" transmits the variance delay(s) to at least one other device included in a node that is not located along the data path in order to implement another security action (e.g. an entry by a third-party device of the variance delay(s) in association with the data path into a routing plan).

Thus, according to the embodiment of FIG. 5 the security action is of the same nature as in the embodiment described above in relation to FIG. 3 and FIG. 4.

For example, the security device 100" transmits the variance delay(s) to a route reflector RR (e.g. the route reflector RR comprises a device 100' as illustrated in FIG. 5) so as to inject the variance delay(s) of the data paths calculated or received (arrow 500_3) as metrics into the EGP (e.g. according to the BGP protocol). The updated EGP is sent back by the route reflector RR to all or part of the N1, N2, N3, N5, N6 (arrow 500_4).

In other embodiments, protection types other than that implemented in the PoT protocol are used for the transmission of data (e.g. the linking or transition delay(s)) to the security device.

In yet other embodiments, no data protection is implemented for the transmission of data (e.g. the linking or transition delay(s)) to the security device.

In relation to FIG. 6, an example of device 600 structure making it possible to implement the steps of the security method of FIG. 2 according to one embodiment of the development is now presented.

The device 600 comprises a random access memory 603 (for example a RAM memory), a processing unit 602 equipped for example with a processor, and controlled by a computer program stored in a read-only memory 601 (for example a ROM memory or a hard drive). Upon initialization, the code instructions of the computer program are for example loaded into a random access memory 603 before being executed by the processor of the processing unit 602.

This FIG. 6 illustrates only a particular way, from a plurality possible, of producing the device 600 so that it performs certain steps of the security method according to the development (according to any one of the embodiments and/or variants described above in relation to FIG. 2). Indeed, these steps may be performed indifferently on a reprogrammable calculation machine (a PC computer, a DSP processor or a microcontroller) executing a program comprising a sequence of instructions, or on a dedicated calculation machine (for example a set of logic gates such as a FPGA or an ASIC, or any other hardware module).

In the case where the device 600 is produced with a reprogrammable calculation machine, the corresponding program (that is to say the sequence of instructions) may be stored in a removable storage medium (such as for example a floppy disk, a CD-ROM or a DVD-ROM) or not, this storage medium being partially or totally readable by a computer or a processor.

In certain embodiments, the device 600 implements any one of the security devices 100, 100' or 100".

In certain embodiments, the device 600 implements a plurality or all of the security devices 100, 100' or 100".

In certain embodiments, the device 600 is included in a network node (e.g. N1, N2, N3, N4, N5, N6, RR, Coll, ASBR, R_AS, etc.).

The invention claimed is:

1. A method of securing the transmission of at least one data packet along a data path of a telecommunications network,
    wherein a security device performs:
        obtaining a variance delay representative of a difference between an actual end-to-end transit delay of the at least one data packet along the data path and an expected end-to-end transit delay of the at least one data packet along the data path, the expected end-to-end transit delay taking into account known physical implementation constraints of the data path; and
        securing the transmission by implementing at least one security action based on the variance delay,
        wherein the at least one security action belongs to a group comprising:
        entering the variance delay into the at least one data packet;
        entering the variance delay in association with the data path into a routing plan of an autonomous system of the network to which the data path belongs;
        destroying or duplicating, for analysis, the at least one data packet when the variance delay is greater than a predetermined threshold;
        transmitting the variance delay to at least one other device included in a node that is not located along the data path in order to implement another security action; and
        combining all or part of the aforementioned security actions of the group.

2. The method according to claim 1, wherein the obtaining of the variance delay corresponds to a calculation of the variance delay comprising obtaining the actual end-to-end transit delay by:
    measuring in advance the end-to-end transit delay along the data path; or by
    measuring in advance a half value of the round trip transit delay along the data path.

3. The method according to claim 2, wherein the data path passes through at least one node of the network,
    and wherein, for each of the nodes, the calculation of the variance delay comprises obtaining a transition delay of the node for the at least one data packet,
    the expected end-to-end transit delay being dependent on the at least one transition delay.

4. The method according to claim 3, wherein the data path passes through at least two nodes of the network,
    and wherein, for each node pair from the at least two nodes, the calculation of the variance delay comprises obtaining a propagation delay of the at least one data packet along the data path between the nodes of the node pair,
    the expected end-to-end transit delay being dependent on the at least one propagation delay.

5. The method according to claim 4, wherein the variance delay is calculated as a function of the actual end-to-end transit delay to which is subtracted the at least one transition delay and/or the at least one propagation delay.

6. The method according to claim 3, wherein the data path extends between a first and a second network node of the network, the security device being housed in the second network node,
    wherein the at least one transition delay is obtained based on at least one parameter conveyed within the at least one data packet.

7. The method according to claim 3, wherein the security device is not located along the data path,
    and wherein the transition delay is received based on the at least one node via at least one other data packet different from the at least one data packet.

8. The method according to claim 7, wherein the transition delay is received in an encrypted form, the security device and the at least one node sharing knowledge of at least one item of encryption information.

9. The method according to claim 1, wherein the at least one security action belongs to the group comprising:
    entering the variance delay in association with the data path into a routing plan of an autonomous system of the network to which the data path belongs;
    transmitting the variance delay to at least one other device included in a node that is not located along the data path in order to implement another security action; and
    combining all or part of the aforementioned alternatives of the group.

10. The method according to claim 1, wherein the obtaining of the variance delay corresponds to a receipt, via another data packet different from the at least one data packet, of the variance delay from another device located along the data path,
    and wherein the at least one security action belongs to the group comprising:
        entering the variance delay in association with the data path into a routing plan of an autonomous system of the network to which the data path belongs;

transmitting the variance delay to at least one other device included in a node that is not located along the data path in order to implement another security action; and combining all or part of the aforementioned alternatives of the group.

11. A non-transitory computer storage medium, storing instructions of a computer program, causing securing transmission of at least one data packet along a data path of a telecommunications network, wherein a security device performs:

obtaining a variance delay representative of a difference between an actual end-to-end transit delay of the at least one data packet along the data path and an expected end-to-end transit delay of the at least one data packet along the data path, the expected end-to-end transit delay taking into account known physical implementation constraints of the data path; and securing the transmission by implementing at least one security action based on the variance delay, when the program is executed by a processors wherein the at least one security action belongs to a group comprising:

entering the variance delay into the at least one data packet;

entering the variance delay in association with the data path into a routing plan of an autonomous system of the network to which the data path belongs;

destroying or duplicating, for analysis, the at least one data packet when the variance delay is greater than a predetermined threshold;

transmitting the variance delay to at least one other device included in a node that is not located along the data path in order to implement another security action; and combining all or part of the aforementioned security actions of the group.

12. A security device for transmitting at least one data packet along a data path of a telecommunications network, wherein the security device comprises a reprogrammable calculation machine or a dedicated calculation machine, configured to:

obtain a variance delay representative of a difference between an actual end-to-end transit delay of the at least one data packet along the data path and an expected end-to-end transit delay of the at least one data packet along the data path, the expected end-to-end transit delay taking into account known physical implementation constraints of the data path; and secure the transmission by implementing at least one security action based on the variance delay, wherein the at least one security action belongs to a group comprising:

entering the variance delay into the at least one data packet;

entering the variance delay in association with the data path into a routing plan of an autonomous system of the network to which the data path belongs;

destroying or duplicating, for analysis, the at least one data packet when the variance delay is greater than a predetermined threshold;

transmitting the variance delay to at least one other device included in a node that is not located along the data path in order to implement another security action; and combining all or part of the aforementioned security actions of the group.

13. A node of a telecommunications network, wherein the node comprises at least one security device for transmitting at least one data packet along a data path of a telecommunications network, wherein the security device comprises a reprogrammable calculation machine or a dedicated calculation machine, configured to:

obtain a variance delay representative of a difference between an actual end-to-end transit delay of the at least one data packet along the data path and an expected end-to-end transit delay of the at least one data packet along the data path, the expected end-to-end transit delay taking into account known physical implementation constraints of the data path; and secure the transmission by implementing at least one security action based on the variance delays wherein the at least one security action belongs to a group comprising:

entering the variance delay into the at least one data packet;

entering the variance delay in association with the data path into a routing plan of an autonomous system of the network to which the data path belongs;

destroying or duplicating, for analysis, the at least one data packet when the variance delay is greater than a predetermined threshold;

transmitting the variance delay to at least one other device included in a node that is not located along the data path in order to implement another security action; and combining all or part of the aforementioned security actions of the group.

* * * * *